United States Patent [19]
Stohlquist et al.

[11] 3,805,478
[45] Apr. 23, 1974

[54] TRAY LOADING APPARATUS

[75] Inventors: Roger H. Stohlquist; Carl J. Beert, both of Rockford, Ill.

[73] Assignee: Anderson Bros. Mfg. Co., Rockford, Ill.

[22] Filed: Jan. 12, 1973

[21] Appl. No.: 323,305

[52] U.S. Cl............................. 53/55, 53/63, 53/73, 53/160, 53/246, 53/251
[51] Int. Cl... B65b 57/06, B65b 57/12, B65b 35/44
[58] Field of Search ........... 53/55, 63, 73, 160, 246, 53/251

[56] References Cited
UNITED STATES PATENTS
2,542,330   2/1951   Henderson et al.................... 53/160
3,570,211   3/1971   Gordon et al...................... 53/246 X Primary Examiner—Travis S. McGehee
Attorney, Agent, or Firm—Morsbach, Pillote & Muir

[57] ABSTRACT

An apparatus for loading articles into trays in which articles are advanced by an infeed mechanism along an article path onto a loading platform and thereafter advanced along the loading platform by an article transfer mechanism and trays are advanced by a tray feed mechanism along a tray path below and converging with the article path at the outlet end of the loading platform to receive the articles. The article transfer mechanism includes a plurality of generally horizontal pushers mounted on an endless carrier for movement in a generally horizontal closed loop course having an inlet run that converges relative to the article path at an angle such that the pushers are spaced apart a distance corresponding to the spacing of the articles on the infeed conveyor mechanism to progressively interfit with the articles as the pushers move along the inlet run, and an outlet run that diverges relative to the article path adjacent the outlet end of the loading platform at an angle corresponding to the spacing of the articles in the trays. The angles of the inlet and outlet runs can be independently adjusted for handling different size articles as well as trays having different article spacing, and the article transfer mechanism can be arranged to effect lateral shifting of the articles as they are advanced to the trays to load the trays in a staggered pattern, if desired.

25 Claims, 14 Drawing Figures

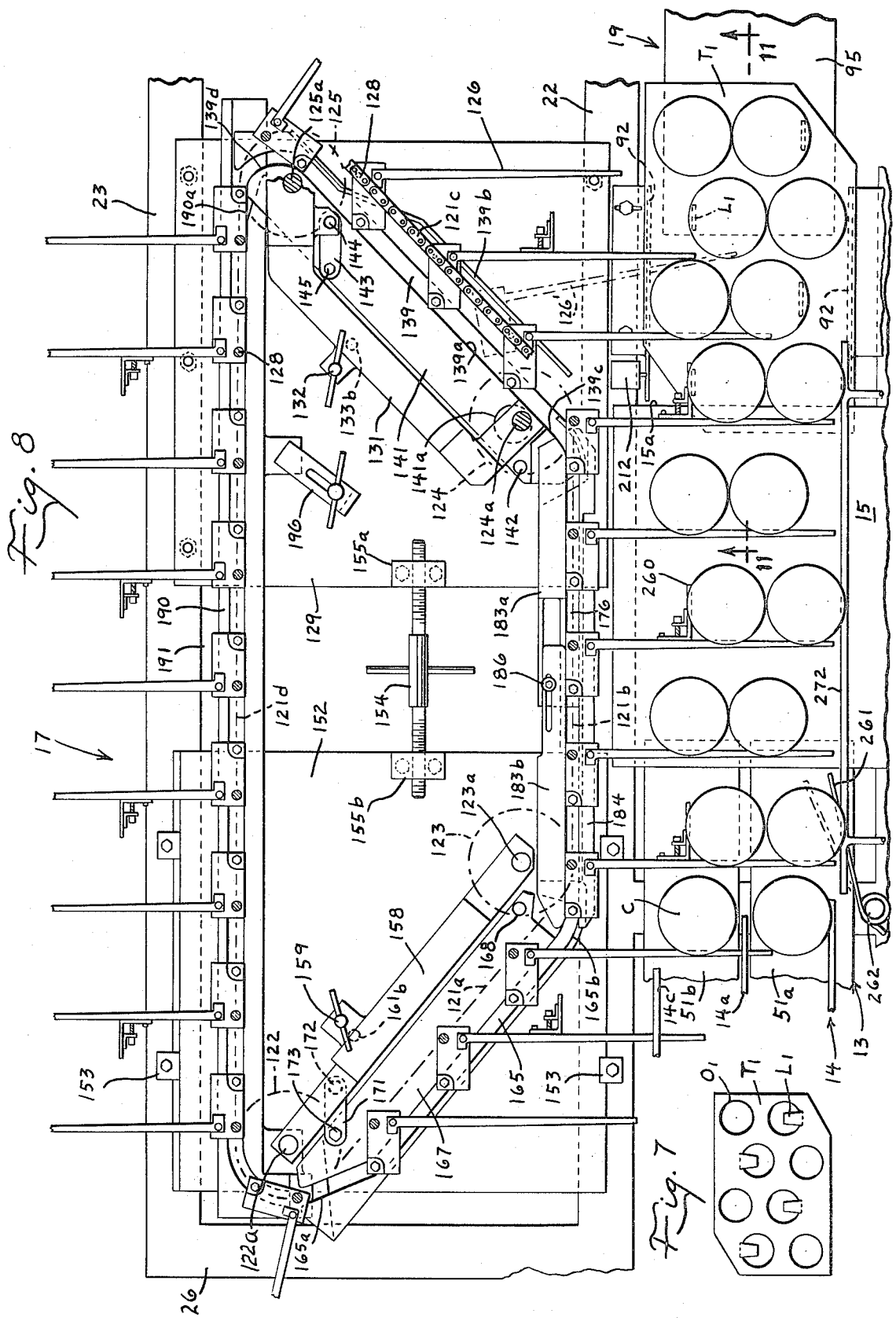

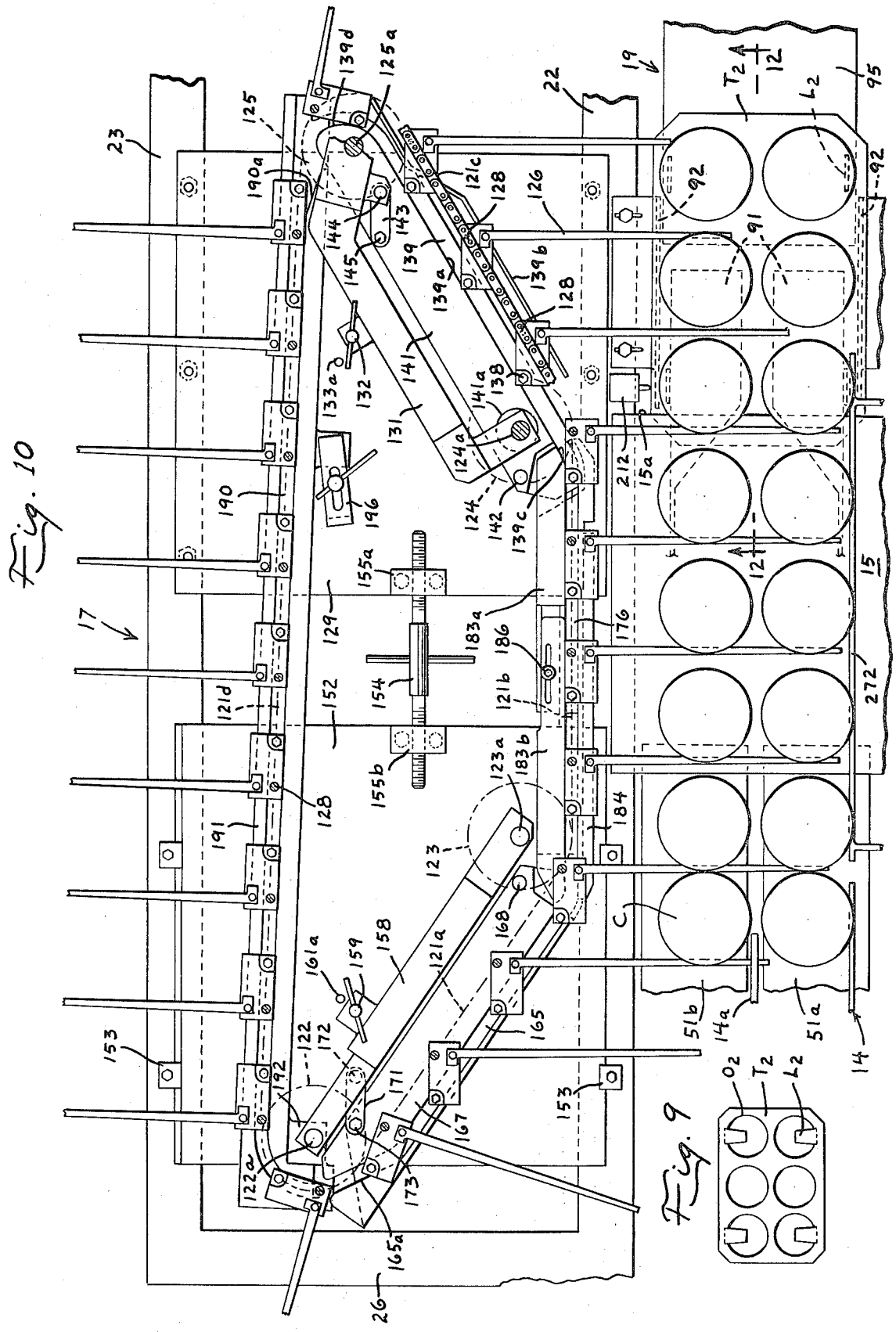

TRAY LOADING APPARATUS

SUMMARY OF THE INVENTION

The present invention relates to an apparatus for loading articles into trays of the type wherein the trays are advanced as row groups of articles are deposited in the tray. The articles such as filled containers are formed into columns of edgewise abutting containers and advanced by an inlet conveyor mechanism onto a loading platform, and the tray loading apparatus has an improved article transfer mechanism which separates the columns of articles into transverse row groups, advances the row groups along the loading platform for deposit into a tray, and continues advance of the row groups after deposit in the tray to advance the tray with the deposited articles for a distance sufficient to position the tray for reception of a succeeding row group of articles. The article transfer mechanism includes a plurality of elongated article pushers spaced apart along an endless chain carrier a distance greater than the diameter of the articles to be loaded and the chain carrier and pushers are guided for movement in a generally horizontal closed loop course of trapezoidal configuration sequentially along an inlet run that converges relative to the column of articles at an angle such that the spacing between the pushers in a direction paralleling the column corresponds to the spacing of the articles in the column so that the pushers progressively interleave between adjacent articles and separate the column of articles into transverse row groups; then along a forward run paralleling the column to advance the separated row groups of articles for deposit into a tray, and then along an outlet run that diverges relative to the forward run at an angle such that the spacing between adjacent pushers corresponds to the desired spacing of the articles in the tray and the pushers continue to advance the articles after deposit in the tray to advance the tray therewith a distance at least sufficient to position the tray for reception of a succeeding row group of articles. The angle of the inlet run is adjustable to vary the spacing between adjacent pushers as they move along the inlet run to adapt the apparatus for handling articles of different size and the angle of the outlet run is adjustable to vary the spacing between adjacent pushers as they move along the outlet run to accommodate different article spacing in the trays. The article transfer mechanism is also adapted to laterally shift selected row groups of articles in a direction transversely of the column to load the articles in different patterns in the tray.

The tray loading machine is arranged so as to automatically load the articles into trays as the articles are supplied to the tray loading machine. Article sensors are provided for sensing an adequate number of articles in the column to fill the tray packaging machine and at least one tray and, when an adequate number of articles are present in the column, the tray conveyor is operated to advance trays in spaced succession to the loading station. Tray sensors sense the presence of a tray at the loading station and, when a tray is advanced to proper position to receive the first row group of articles, the article transfer mechanism is activated to advance articles into the tray and to advance the tray with the articles while depositing successive row groups of articles in the tray until the tray is filled. When the filled tray is moved away from the loading station, operation of the article transfer mechanism is interrupted until a succeeding empty tray is advanced to proper loading position.

These, together with other features and advantages of this invention will be more readily understood by reference to the following detailed description, when taken in connection with the accompanying drawings wherein:

FIG. 7 is a plan view of one form of tray adapted to be loaded by the tray loading apparatus;

FIG. 8 is a fragmentary horizontal sectional view illustrating the article transfer mechanism on a larger scale than FIG. 2 and adjusted for loading one size of articles into trays of the form shown in FIG. 7;

FIG. 9 is a plan view of another form of tray having a different pattern of tray receiving openings and adapted to be loaded by the tray loading apparatus;

FIG. 10 is a fragmentary horizontal sectional view through the tray loading apparatus and illustrating the article transfer mechanism in a different adjusted position thereof for handling articles of a different size than in FIG. 8 and for loading trays of the form shown in FIG. 9;

The tray loading apparatus is arranged for loading articles such as filled containers into trays and is particularly adapted for loading containers such as round tapered cups designated C into trays of the type having article receiving openings or pockets arranged to locate articles in the tray in a preselected pattern. The trays can be in the form of generally flat tray blanks having article receiving openings arranged in a preselected pattern and means such as depending legs, flanges or the like for supporting the flat tray blank in an elevated position to engage the articles at a location above the bottom of the articles, or the trays can be molded or otherwise formed with depressed pockets for receiving at least the lower portion of the articles to be loaded in the trays. The trays can be formed of various different materials such as fiber or plastic and can be of different size and have the article receiving openings or pockets arranged in different patterns. The trays may, for example, be of the form shown in FIG. 7 and designated $T_1$ having article receiving openings $O_1$ arranged in a staggered pattern and having legs $L_1$ adapted, when erected to support the trays in an elevated position. A modified form of tray is shown at $T_2$ in FIG. 9 having article receiving openings $O_2$ aligned in lengthwise rows and legs $L_2$. The tray loading machine is adapted for handling containers of different size and to load trays of different width and length. In the embodiments illustrated, the trays have two article receiving openings in each transverse row, it being understood that the number of article receiving openings in each transverse row and the corresponding number of articles in each transverse row can be varied if desired.

Figure 1:
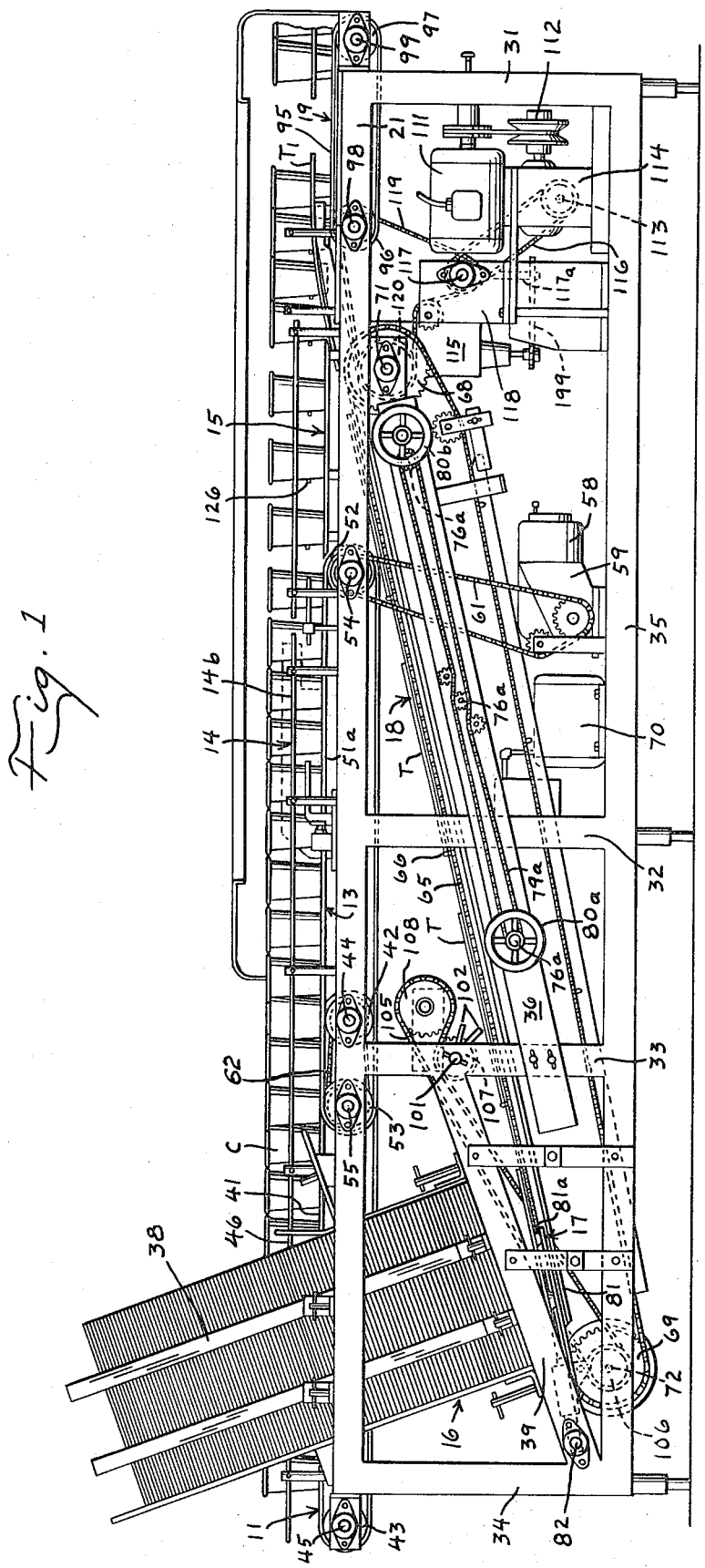
FIG. 1 is a side elevational view of the tray loading apparatus.
Figure 2:
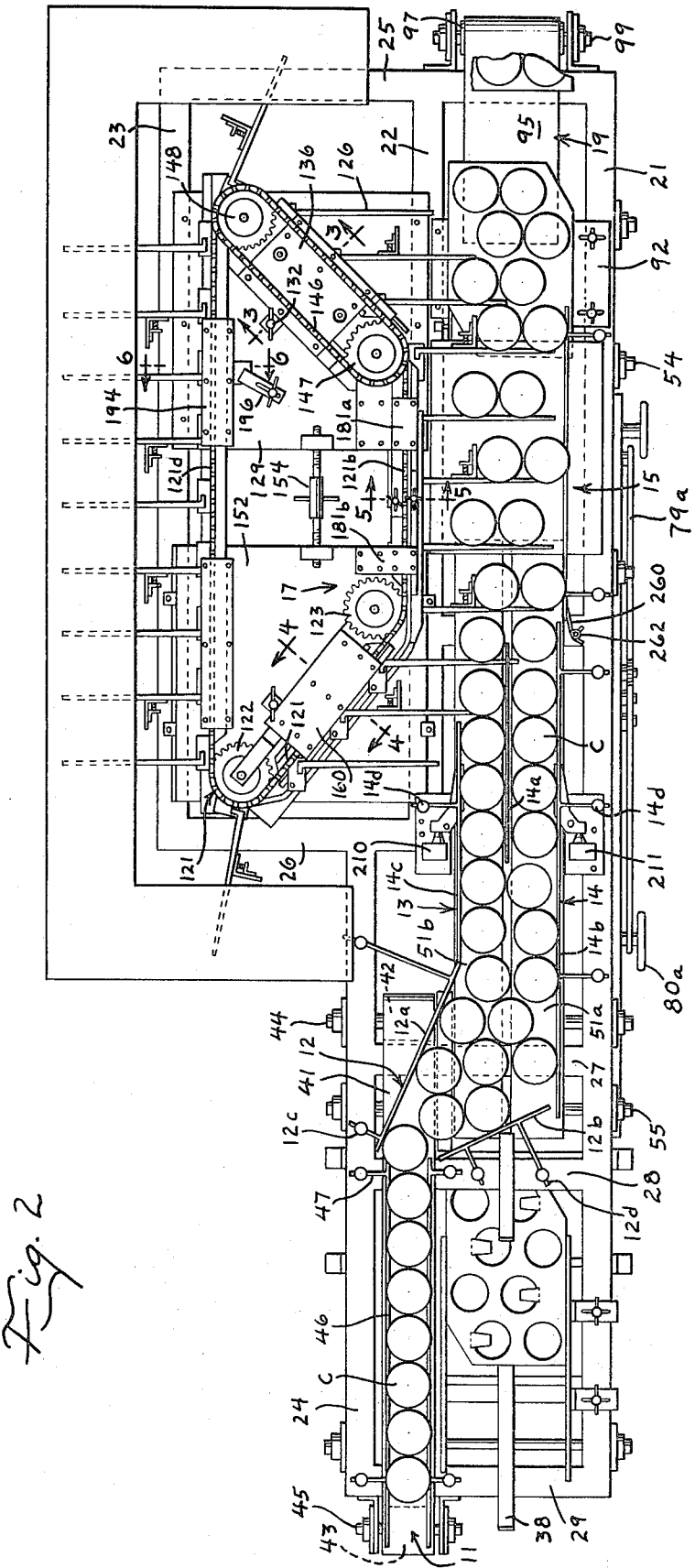
FIG. 2 is a top plan view of the tray loading apparatus.

As best shown in FIGS. 1 and 2, the tray loading apparatus in general includes an inlet conveyor 11 arranged to receive articles such as containers from a filling machine (not shown) and to advance said containers through a guide system 12 into multiple columns on an infeed conveyor mechanism 13. The infeed conveyor mechanism 13 advances the column of articles in edge-to-edge abutting relation along an article path defined by column guides 14 onto a loading platform 15. The trays T to be loaded are stored in a tray magazine 16 and trays in the lower end of the magazine are intermittently fed by a tray dispensing mechanism 17 onto a tray conveyor 18 which advances the trays along a tray path disposed below and converging with the article path adjacent the outlet end of the loading platform 15. An article transfer mechanism 17 is provided alongside the article path and arranged so as to separate the articles in the column into transverse rows, feed the transverse rows of articles across the loading platform and into the trays at the outlet end of the loading platform, the article transfer mechanism being arranged to continue advance of the articles after depositing the same into the trays to advance the trays with the articles for a distance at least sufficient to receive a succeeding row group of articles. An outlet conveyor mechanism 19 is provided to advance the filled trays away from the tray loading apparatus and may, for example, be arranged to advance the trays to a succeeding wrapping machine (not shown).

The several instrumentalities are conveniently supported on a common base which, in the embodiment illustrated, includes upper longitudinally extending frame members 21, 22, 23 and 24 and transverse members 25, 26, 27, 28 and 29 (FIG. 2) which are rigidly interconnected with the longitudinal members to form a rigid upper frame structure. The upper frame structure is supported as by upright frame members shown in FIG. 1 and designated 31, 32, 33 and 34 on a lower frame structure including lower longitudinal frame members 35 and suitable lower cross frame members (not shown).

The inlet conveyor 11 can be of any suitable form for advancing a column of articles and, in the embodiment illustrated, comprises an endless belt 41 entrained over spaced rollers 42 and 43 having shafts 44 and 45 journaled on the frame. The containers C are laterally guided along the inlet conveyor by inlet guides 46 supported by brackets 47 (FIG. 1) for adjustment laterally of the inlet conveyor to accommodate containers of different size.

The infeed conveyor is arranged to advance the articles in sidewise aligned columns onto the loading platform 15 and is herein shown in the form of a pair of endless-type belts designated 51a and 51b which are entrained over rollers 52 and 53 (FIG. 1) having shafts 54, 55 rotatably supported on the upper frame structure. The column guides 14 include an intermediate guide rail 14a disposed between the conveyor belts 51a and 51b, and side guides 14b and 14c which extend generally parallel to the intermediate guide 14a and which are supported for lateral adjustment as by brackets 14d (FIG. 2) to accommodate containers of different size. As shown in FIG. 2, the infeed conveyor 13 is laterally offset from the inlet conveyor 11 and the article guide system 12 includes lateral guides 12a and 12b which are adjustably mounted by brackets 12c and 12d and arranged to guide the single column of containers from the inlet conveyor 11 laterally onto the infeed conveyor in a manner to form the multiple column of containers. As shown in FIG. 1, the infeed conveyor 13 is driven as by a motor 58 through a speed reducer 59 and chain 61 entrained over a sprocket (not shown) on the shaft 54, and the inlet conveyor 11 is continually driven in timed relation with the infeed conveyor at approximately twice the speed as by a drive chain 62 entrained over appropriately sized sprockets (not shown) on the inlet and infeed conveyor shafts 44 and 55.

Figure 11:
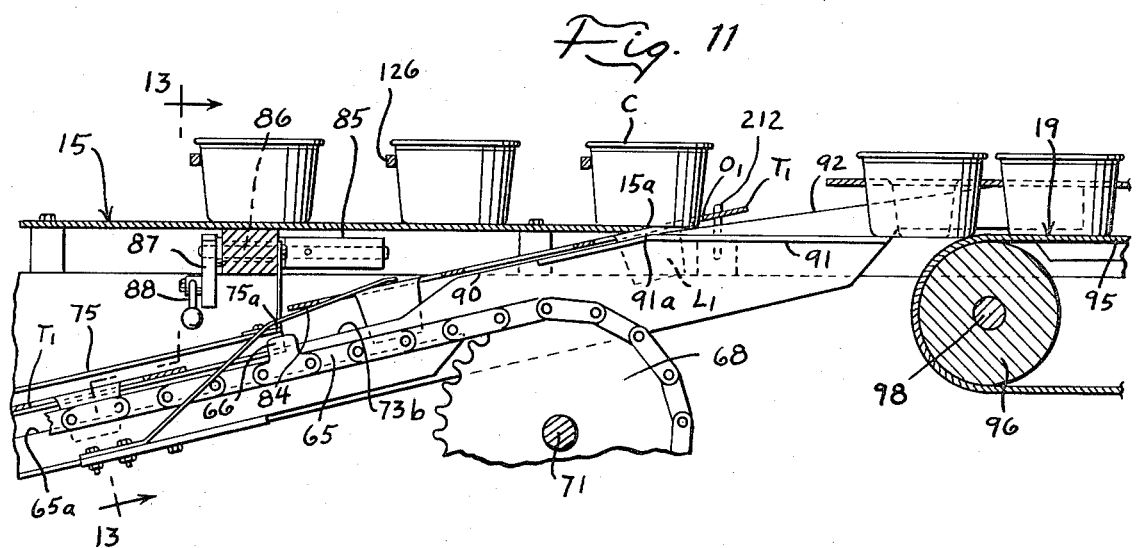
FIG. 11 is a fragmentary vertical sectional view through the tray feed mechanism taken on the plane 11—11 of FIG. 8 and arranged for feeding trays of the form shown in FIG. 7.
Figure 12:
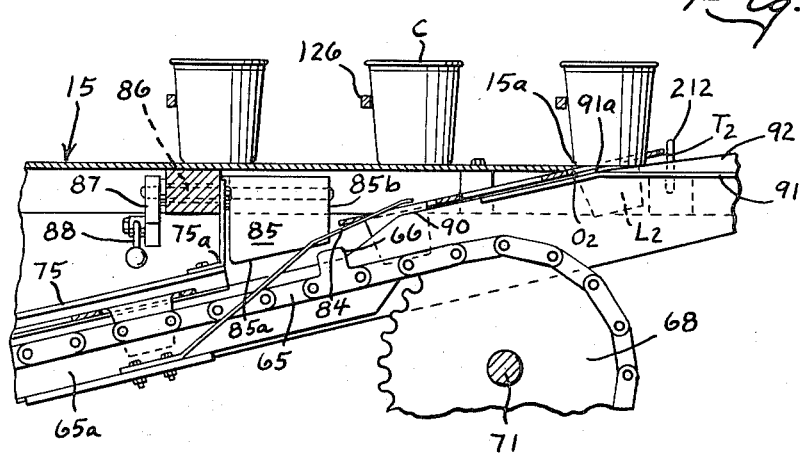
FIG. 12 is a fragmentary vertical sectional view through the tray feed mechanism taken on the plane 12—12 of FIG. 10 and arranged for feeding trays of the form shown in FIG. 9.
Figure 13:
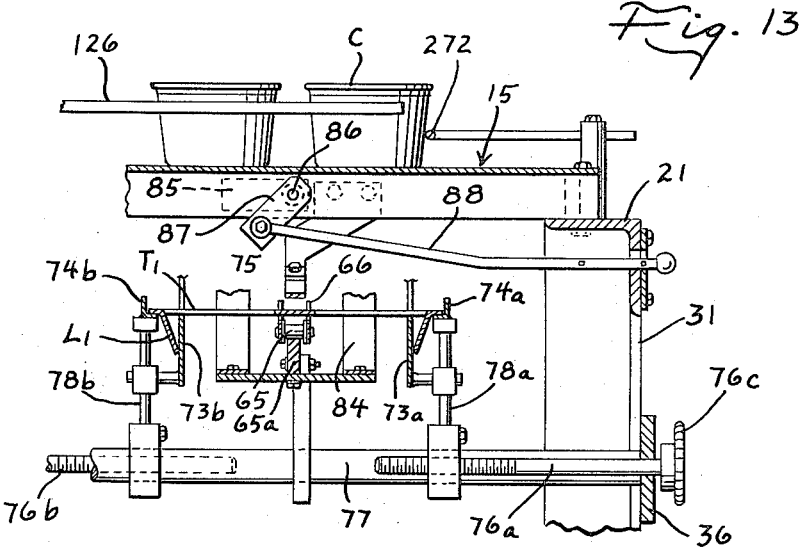
FIG. 13 is a fragmentary vertical sectional view through the tray feed mechanism taken on the plane 13—13 of FIG. 11.

The tray conveyor 18 is arranged to advance the trays T in spaced succession along a tray path disposed below and converging with the loading platform 15 adjacent its outlet end and is preferably of the endless type including an endless chain 65 having tray engaging lugs 66 at locations spaced therealong a distance greater than the maximum length of the trays to be loaded. The tray conveyor chain 65 is entrained over upper and lower sprockets 68 and 69 mounted on shafts 71 and 72 and the upper run of the chain is guided by a chain guide rail 65a. As best shown in FIG. 11, 12 and 13, the tray conveyor also includes a pair of tray support guide rails 73a, 73b, that underlie and support the tray; a pair of lateral tray guide rails 74a, 74b that engage the sides edges of the tray to laterally guide the tray, and an overhead guide rail 75 that overlies the trays on the conveyor to hold them in position against the conveyor lugs 66. The pairs of tray support guide rails 73a, 73b and the lateral tray guide rails 74a, 74b are supported at spaced locations therealong on lengthwise extending conveyor frame members 36 and are advantageously mounted for adjustment relative to the conveyor frame members 36 in a direction laterally of the tray conveyor to accommodate trays of different width. For this purpose, guide rods 77 are attached at spaced locations along the lengthwise conveyor frame members 36 to extend crosswise of the tray conveyor and each have pairs of brackets 78a, 78b slidable therealong. As best shown in FIG. 13, tray support rail 73a and lateral tray guide rail 74a are supported on brackets 78a slidable along rods 77 for adjustment laterally of the tray conveyor and tray support rail 73b and lateral tray guide rail 74b are similarly supported on brackets 78b slidable along rods 77 for adjustment laterally of the tray conveyor. Lead screws 76a, 76b respectively threadedly engage brackets 78a, 78b and are non-slidably and rotatably supported on the lengthwise conveyor frame members 36 for positively adjusting the brackets 78a, 78b. As shown in FIG. 1, the several lead screws 76a for adjusting brackets 78a are interconnected by a chain 79a for simultaneous turning under the control of a hand wheel 80a, and a similar arrangement (not shown) is provided at the other side of the tray conveyor for simultaneous turning of lead screws 76b under the control of a hand wheel 80b.

The tray magazine 16 can be of conventional construction and, as shown, includes magazine guides 38 that extend upwardly from a frame 39 that overlies the tray conveyor and which releasably supports the lowermost tray in the stack. The tray feed mechanism 17 operates to withdraw the lowermost tray from the stack and to deposit the same on the tray conveyor in timed relation with the advance of the conveyor and, in the embodiment shown in FIG. 1, comprises a vacuum operated feed mechanism including an arm or arms 81 having vacuum cups 81a thereon. The arms 81 are swingably mounted by a shaft 82 on the base and are cyclically oscillated as by a cam (not shown) on the conveyor shaft 72 between a position engaging the lowermost tray in the stack and a position below the tray conveyor to transfer the tray from the stack to the tray conveyor. As is common in such vacuum operated feed mechanism, the vacuum to the cups 81a is advantageously valved on and off in timed relation with the movement of the arms 81 to shut off the vacuum to the vacuum cups 81a and release the tray when the tray has been transferred to the tray conveyor.

The lugs 66 in the tray conveyor advance the trays in spaced succession along the tray path to the outlet end of the loading platform and provision is made for interrupting advance of the tray when the tray receiving openings O adjacent the lead end of the tray reach a preselected position, herein referred to as a loading position, in which the lead ends of the first row of openings in the trays are positioned beyond the outlet end 15a of the loading platform and extend above the level of the loading platform as shown in FIGS. 11 and 12, so as to allow a row group of articles to enter the first row of article receiving openings in the trays. For this purpose, the outlet end 75a of the overhead guide rail 75 terminates at a location spaced from the outlet end of the loading platform a distance such that the longest tray $T_1$ to be loaded will reach the aforedescribed loading position when the trail edge of the tray passes the outlet end 75a of the overhead guide rail 75. Leaf springs 84 are provided adjacent the outlet end of the overhead guide rail 75 to yieldably bias the tray upwardly and, when the trailing end of the tray passes the outlet end 75a of the overhead guide rail 75, the springs shift the trailing end of the tray upwardly and out of the path of advance of the tray advancing lugs 66. This interrupts advance of the tray with the tray conveyor as shown in FIG. 11. The lower tray guide rails 73a and 73b each have a raised tray guide portion 90 at their outlet ends offset above the level of the lower guide rail to guidably support the tray as it rides thereover at a level above the path of advance of the tray transfer lugs 66. In order to adapt the apparatus for handling trays such as $T_2$ shorter than the trays $T_1$ previously described, a shiftable holddown guide extension 85 is provided with a lower guide surface 85a arranged to form a continuation of the overhead guide rail 75, when the guide extension is in its operative position shown in FIG. 12. The guide extension will maintain the shorter tray $T_2$ in engagement with the tray engaging lugs 66 on the tray conveyor, until the trailing edge of that tray is advanced to the outlet end 85b of the guide extension.

At that time, the leaf springs 84 operate to raise the trailing edge of the tray out of the path of advance of the lugs. The guide extension is selectively movable into and out of an operative position and, as shown in FIGS. 11–13, is mounted for vertical swinging movement on a shaft 86 which is manually operable as by a lever 87 and link 88 arrangement between its operative and inoperative positions.

Outlet container guides 91 are provided at the outlet end 15a of the loading platform 15 and are spaced from the outlet end of the loading platform to provide an opening or tray slot 91a to allow passage of the tray therethrough. The outlet container guide is arranged to underlie and support the containers as they move off the loading platform and is disposed adjacent the level of the loading platform but preferably slightly below as shown in FIGS. 11 and 12 so as to avoid interference with movement of the articles off the loading platform. The outlet container guide is conveniently mounted on or formed integrally with the lower tray guide rails 73a, 73b and, as best shown in FIG. 10, comprises flanges which extend laterally inwardly from the outlet ends of the tray guide rails 73a, 73b to underlie the openings in the trays and support the articles at the bottom thereof. The trays are guided by tray guides 92 to a level above the level of the outlet container guide 91 so that the trays are disposed at a level above the bottoms of the containers. As best shown in FIGS. 8 and 10, the tray guides 92 are arranged to underlie and engage the trays adjacent opposite side edges and are conveniently mounted on the longitudinal frame members 21 and 22 for adjustment laterally of the tray conveyor to accommodate trays of different width. The trays are advantageously arranged so as to be self-supporting in an elevated position above the bottom of the containers. In the tray forms illustrated in FIGS. 7 and 9, the trays $T_1$ and $T_2$ are provided with depending support legs $L_1$ and $L_2$ respectively to support the trays in an elevated position relative to the lower ends of the containers. The outlet conveyor 19 extends from the outlet end of the container support 91 to advance the filled trays away from the tray loading machine and the outlet conveyor is conveniently of the endless belt type including a belt 95 entrained over rollers 96 and 97 rotatably supported by shafts 98 and 99 on the frame. Belt 95 is made sufficiently wide to support the articles and the depending legs on the trays to advance the filled trays with the trays elevated above the bottoms of the articles by the tray legs.

The trays with the tray legs are preferably stored in a flattened condition in the tray magazine 16 and a rotary leg depressor is provided for depressing the tray legs downwardly as the trays are advanced by the tray conveyor 18. As shown in FIG. 1, the leg depressor includes a shaft 101 rotatably supported above the tray conveyor and outwardly extending leg depressing fingers 102 arranged on the shaft to extend into the appropriate openings in the trays and depress the legs as the trays advance along the tray conveyor. The leg depressor is rotated in timed relation with the tray conveyor as by a chain 105 entrained over a sprocket 106 on the conveyor shaft 72 and over a sprocket 107 on the leg depressor shaft 101 and an idler sprocket 108. As will be seen from FIG. 1, the leg depressor drive is arranged to rotate the shaft 101 in a counterclockwise direction as viewed in FIG. 1 to complete one revolution in the time the tray conveyor advances a distance corresponding to the spacing between adjacent tray engaging lugs. As will be seen from FIGS. 1, 7 and 9, the legs on the trays are advantageously formed in the tray receiving openings so that the containers will aid in holding the legs in a downwardly extending position when the containers are inserted in the openings. The arrangement of the fingers 102 on the leg depressor are laterally and circumferentially positioned to extend into the tray receiving openings and engage the legs therein. As will be readily understood, a different leg depressor finger arrangement will be required for trays having the openings arranged at a different spacing or in a different pattern. As shown in FIG. 13, the tray support guide rails 73a, 73b are spaced inwardly from the respective lateral tray guide rails 74a, 74b and are arranged to engage and guidably retain the tray legs in a depending position as the trays are advanced along the tray conveyor.

As best shown in FIG. 1, the tray conveyor is driven from a drive motor 111 through a variable speed drive, such as an adjustable pulley and belt drive 112 and, clutch-brake unit 114. Clutch-brake unit 114 has its output shaft 113 drivingly connected through a chain 116 to a shaft 117 on a right angle drive unit 118 and the shaft 117 is otherwise drivingly connected through a chain 119 to a drive sprocket 120 on the tray conveyor shaft 71 and to a drive sprocket (not shown) on the outlet conveyor shaft 98 to drive the tray conveyor and outlet conveyor in timed relation under the control of the clutch-brake unit 114.

The article transfer mechanism 17 is arranged to separate the articles in the column of articles on the inlet conveyor into transverse row groups, advance the row groups along the loading platform 15; insert the transverse row groups into the openings in the trays and then advance the trays during loading of each row group of articles in the trays a distance sufficient to receive the next succeeding row group. The article transfer mechanism is best illustrated in FIGS. 2, 8 and 10 and includes an endless chain carrier 121 entrained over sprockets 122, 123, 124 and 125 for movement in a generally horizontal closed loop course laterally offset to one side of the loading platform and infeed conveyor. The endless chain is supported by the sprockets 122–125 for movement in a generally trapezoidal course having an inlet run 121a that converges relative to the column of containers on the infeed conveyor 13; a forward run 121b that extends forwardly and generally parallel to the path of travel of the articles on the infeed conveyor; an outlet run 121c that diverges laterally relative to the path of advance of the articles, and a return run 121d that extends back to the inlet run. A plurality of elongated article pushers 126 are mounted at spaced locations along the carrier chain and are supported on the carrier chain to extend generally horizontally outwardly therefrom and for limited swinging movement relative thereto. As shown, the elongated pushers 126 are rigidly supported at one end on carrier blocks 127 and the carrier blocks are pivotally mounted as by pins 128 on the carrier chain at locations spaced therealong a distance substantially greater than the maximum horizontal dimension of the articles measured in a direction lengthwise of the article path. With the round tapered cups illustrated, the article pushers are spaced apart a distance substantially greater than the maximum diameter of the largest size containers to be loaded into trays.

Figure 3:
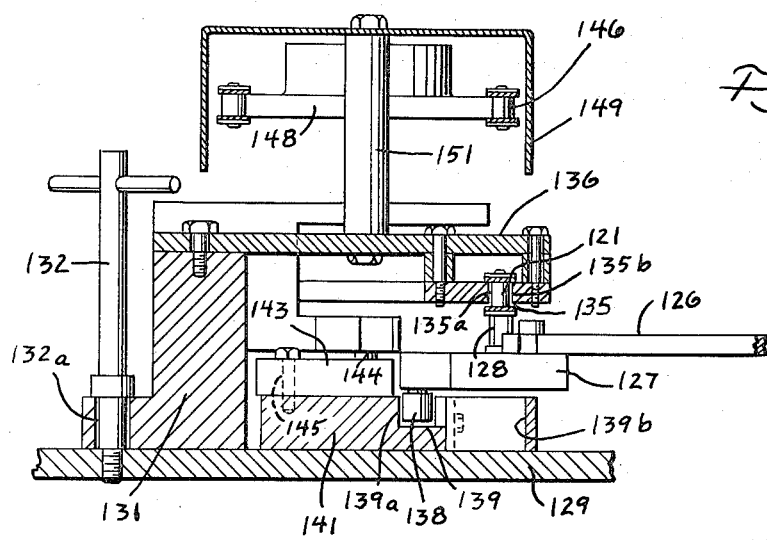
FIG. 3 is a fragmentary sectional view through the article transfer mechanism taken on the plane 3—3 of FIG. 2.

A drive shaft 124a for the transfer is rotatably mounted by bearings (not shown) on a fixed mounting plate 129 rigidly secured to the frame members 22 and 23 and the carrier chain sprocket 124 is supported on the drive shaft 124a for free rotation relative thereto. As best shown in FIGS. 8 and 10, the sprocket 124 is positioned at a location laterally offset from the loading platform 15 and adjacent its outlet end 15a such that the outlet run 121c of the carrier chain begins to diverge relative to the article path at a location closely adjacent the outlet end of the loading platform. The angle of divergence of the outlet run 121c of the carrier chain is made adjustable to adapt the tray loading apparatus for loading articles at different longitudinal spacing in the trays. For this purpose, an elongated bracket 131 (FIGS. 8 and 10) is swingably supported at one end on the shaft 124a for limited angular movement about the axis of that shaft and the sprocket 125 is non-rotatably keyed to an upright stub shaft 125a that is non-slidably but rotatably mounted on the other end of the arm 131. The stub shaft has its lower end spaced above the fixed mounting plate 129 so that the sprocket 125 can be shifted relative to the mounting plate 129 along an arc concentric with shaft 124a to adjust the angle of divergence of the outlet run 121c of the carrier chain 121. Any suitable means may be provided for locking the bracket 131 in an angularly adjusted position thereof and, as shown, a wing bolt 132 extends through an opening 132a (FIG. 3) in the bracket 131 and is adapted to be threadedly inserted into spaced openings such as shown at 133a and 133b in the base 129, which openings are disposed in an arc concentric with the shaft 124a. As will be appreciated, the number of openings such as 133a and 133b can be varied as desired to correspond to the number of different angular positions required for filling different trays. A carrier chain guide track 135 is mounted in fixed relation to the bracket 131 to guide the carrier chain during movement along its outlet run and, as best shown in FIG. 3, the chain guide track 135 is defined by laterally spaced guide rails 135a and 135b secured as by a plate 136 to the bracket 131 for movement as a unit therewith. The carrier chain 121 is advantageously of the roller type and, as shown in FIG. 3, is guidably received in the guideway 135.

The article pushers 126, as they move along the outlet run, are arranged to advance the articles into the openings in the trays and thereafter to advance the trays with the articles until the article pushers are retracted from between the articles in the tray. For this purpose, the article pushers are guided so as to be maintained substantially perpendicular to the article path, while they are in pushing engagement with the articles. However, when the tray is filled, it is desirable to allow the outlet conveyor 19 to move the filled tray away from the tray loading apparatus. The article pushers are accordingly guided as they move along the outlet run in a manner to allow the pushers to move forwardly with the articles, when the outlet conveyor advances the filled tray away from the tray loading apparatus. As best shown in FIGS. 3, 8 and 10, followers 138 are mounted on the carrier blocks 127 at locations offset a preselected distance from the pivot pins 128 in a plane perpendicular to the longitudinal axis of the pushers 126. The followers 138 extend into a guide track 139 formed in a track member 141 to guide the followers and maintain the pushers generally perpendicular to the article path during at least a portion of the movement along the outlet run. The guide track 139 includes an upright guide rail 139a arranged to engage the followers 138 to limit angular movement of the pushers about the pivot pins 128, in a clockwise direction as viewed in FIGS. 8 and 10, to a position in which the pushers are maintained generally perpendicular to the article path. The other guide rail 139b of the guide track 139 is spaced laterally from the rail 139a a distance substantially greater than the diameter of the follower 138 to allow the pushers to pivot in a counterclockwise direction about the pivot pins 128 as shown in phantom at 126 in FIG. 8, to allow the outlet conveyor to advance a filled tray away from the tray loading apparatus.

It is necessary to shift the track member 141 relative to the outlet run 121c of the carrier chain in order to maintain the pushers generally perpendicular to the article path in the different angularly adjusted positions of the outlet run, and the track member 141 is formed with an enlarged opening 141a around the shaft 124a and underlies the lower end of the stub shaft 125a to allow limited shifting movement of the track member relative to the sprockets 124 and 125. The track member is advantageously automatically shifted during angular adjustment of the outlet run, in a manner to maintain the pushers generally perpendicular to the article path, by a parallelogram-type linkage. As shown in FIGS. 8 and 10, the track member 141 is pivotally supported by a pin 142 on the mounting plate 129 at a location offset from the shaft 124a in a direction paralleling the article path a distance corresponding to the spacing between the follower 138 and the pivot pin 128 that supports the pushers on the carrier chain. A link 143, having an effective length corresponding to the spacing between the shaft 124a and pin 142, is pivotally connected at one end by a pin 144 to the bracket 131, at a location in a plane connecting the shafts 124a and 125a, and is pivotally connected at its other end by a pin 145 to the track member 141 at a location to extend parallel to a plane through the shaft 124a and pin 142. With this arrangement, the track 139 will be automatically shifted relative to the outlet run 121c of the carrier chain 121 in a manner to maintain the pushers generally perpendicular to the article path, as the angle of the outlet run is varied. As shown in FIGS. 8 and 10, the track 139 has a curved inlet section 139c generally concentric with the pivot pin 142 and arranged to merge with the forward run track section to be described hereinafter, and the track 139 has a curved outlet section 139d arranged to merge with the return run track section, also to be described hereinafter. As best shown in FIGS. 2 and 3, the drive shaft 124a for the transfer mechanism is drivingly connected to the shaft 125a to drive the carrier chain sprocket 125 by a chain 146 entrained over sprockets 147 and 148 respectively non-rotatably keyed to shafts 124a and 125a at a level above the sprockets 124 and 125. A chain guard 149 (FIG. 3) is conveniently mounted by a bracket 151 on the plate 136 to protectively enclose the chain 146 and the sprockets 147, 148.

Figure 4:
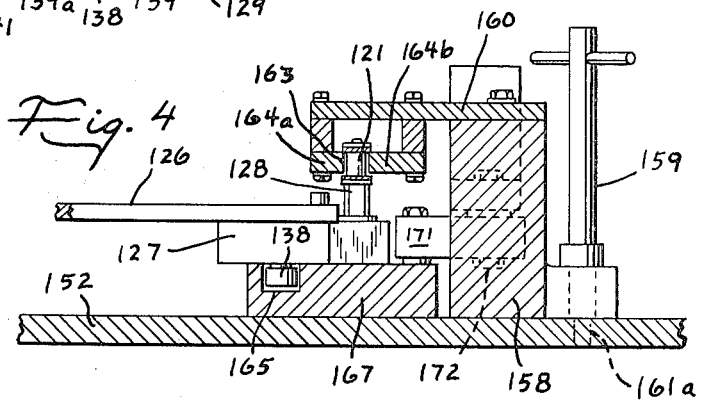
FIG. 4 is a fragmentary sectional view through the article transfer mechanism taken on the plane 4—4 of FIG. 2.

A second base plate 152 is slidably supported on the frame members 22 and 23 and guided by guides 153 for movement relative to the base member in a direction paralleling the article path. A means, such as an oppositely threaded screw 154 that threadedly engages followers 155a and 155b on the mounting plate 129 and 152 respectively, is provided to effect positive adjustment of the mounting plate 152 toward and away from the plate 129. The carrier chain sprocket 123 has a shaft 123a rotatably supported on the adjustable mounting plate 152 at a location laterally offset from the outlet end of the infeed conveyor 13. As will be seen from FIGS. 8 and 10, the sprocket 123 is offset from the article path a distance corresponding to the offset of the sprocket 124 so that the forward run 121b of the carrier chain extends generally parallel to the article path. The angle of the inlet run 121a is also made adjustable to accommodate containers of different size and which have a different longitudinal spacing on the infeed conveyor. As best shown in FIGS. 8 and 10, a rigid bracket 158 is swingably mounted at one end on the shaft 123a and supports the shaft 122a of sprocket 122 at its outer end so that the sprocket 122 is adjustable relative to the base plate 152 in an arc about the axis of shaft 123a. The bracket 158 is selectively locked in adjusted position as by a wing bolt 159 that extends through an opening in the bracket 158 and which is adapted to be threadedly inserted into openings such as 161a, 161b located on an arc concentric with the shaft 123a. The number and spacing of the openings 161a, 161b along the arc can be varied as required for locking the bracket 158 in the different angularly adjusted positions desired. As best shown in FIG. 4, the inlet run 121a of the chain 121 is guided in a trackway 163 defined between spaced rails 164a, 164b mounted by a plate 160 on the bracket 158 for movement as a unit therewith. An inlet follower guide track 165 is also provided for engaging the followers 138 to maintain the pushers generally perpendicular to the article path during movement along at least a substantial portion of the inlet run. As shown in FIGS. 4, 8 and 10, the inlet guide track 165 is formed in a track member 167 and the track member 167 is pivotally supported by a pin 168 on the adjustable base 152 at a location offset in the direction paralleling the article path from the shaft 123a a distance corresponding to the spacing between the followers 138 and the pivot pins 128 that support the pushers on the carrier chain. A link 171, having an effective length corresponding to the spacing between the shaft 123a and the pivot pin 168, is pivotally connected by a pin 172 on the bracket 158 at a location in a plane through the axes of the shafts 122a and 123a, and is pivotally connected by a pin 173 to the track member 167 to extend generally parallel to the plane through the shaft 123a and pin 168. With this arrangement, the spacing of the track 165 relative to the inlet run 121a of the carrier chain is automatically adjusted to maintain the pushers generally perpendicular to the article path, as the angle of the inlet run is varied. As shown, the track 165 has an angulated inlet section 165a arranged to merge with the return track to be described hereinafter, and an outlet section 165b which is curved about the center of the pivot pin 168 to merge with the forward track section also to be described hereinafter.

Figure 6:
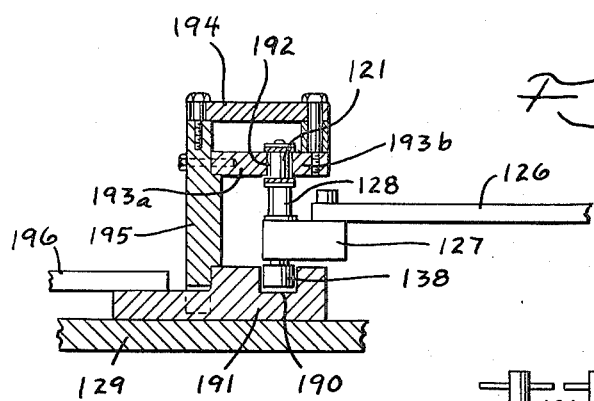
FIG. 6 is a fragmentary sectional view through the article transfer mechanism taken on the plane 6—6 of FIG. 2.
Figure 5:
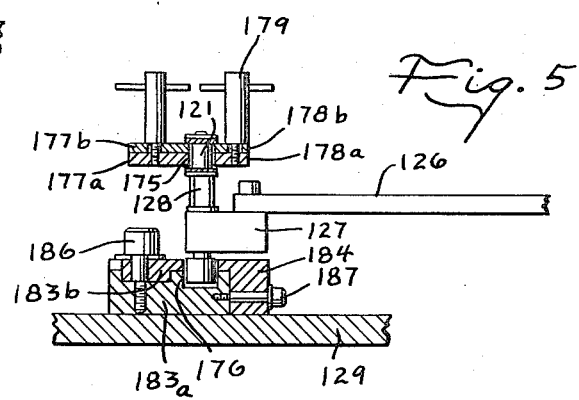
FIG. 5 is a fragmentary sectional view through the article transfer mechanism taken on the plane 5—5 of FIG. 2.

The pushers 126 are maintained perpendicular to the article path during movement along the forward run 121b of the carrier chain by an upper chain guide track 175 and a lower follower guide track 176 (FIG. 5). The chain guide track 175 and the follower guide track 176 are made longitudinally adjustable to accommodate changes in the spacing between the sprockets 123 and 124. For this purpose, the upper track 175 is formed by elongated track members 177a, 177b and 178a, 178b and track members 177a, 178a are mounted by brackets 181a on the plates 129 while the track members 177b, 178b are mounted on base plate 152. The track members 177a, 177b and 178a, 178b have portions intermediate their ends that overlap as shown in FIG. 5 to permit relative longitudinal adjustment of the members, and the overlapping track portions are selectively locked in adjusted position by clamp screws 179. The lower follower guide trackway 176 is similarly adjustable and is formed by track members 183a, 183b and 184. Track member 183a is attached to the base plate 129 and track members 183b and 184 are attached to the base plate 152 and track members 183b and 184 have portions that overlap as shown in FIG. 5 to allow relative longitudinal adjustment of the track members. Clamp screws 186 and 187 are provided for locking the track sections 183b, 183a and 184 in adjusted position. A return guide track 190 for the followers 138 is also provided and, as shown, includes return lower follower guide track member 191 mounted at one end by a bracket 192 on sprocket shaft 122a on the mounting base 152 for limited lateral adjustment relative thereto and the track member 190 has a length sufficient to extend beyond the carrier chain sprocket 125a in all adjusted positions thereof. The other end 190a of the return trackway 190 is inclined as shown in FIGS. 8 and 10 to receive the followers 138 from the outlet end 139d of the outlet run follower guide track 139. A return run chain guide track 192 is preferably provided along at least portions of the return run and, as shown in FIG. 6, includes track members 193a, 193b supported by a plate 194 and bracket 195 on the lower follower guide track member 191. The return follower guide track member 191 and chain guide track members 193 a, 193b are thus arranged to accommodate a relative change in the spacing and positions of the sprockets 122 and 125 and a means such as a clamp 196 is provided for locking the return track members in their adjusted positions to the base plate 129. In general, the clamp 196 is utilized to lock the return guide to the base plate 129 after the angles of the inlet and outlet runs have been adjusted and in such a manner as to provide a generally straight return run between the sprockets 125 and 122.

The article transfer mechanism 17 is driven at a linear speed approximately equal to the linear speed of the tray conveyor and provision is made for interrupting the drive to the article transfer mechanism after a tray has been filled and until the tray conveyor advances a succeeding tray to a loading position, to thereby time the tray feed with the loading operation. As shown in FIG. 1, a clutch-brake mechanism 115 has its input shaft drivingly connected through a chain 199 to a take-off shaft 117a on the right angle drive 117 and its output shaft connected to the sprocket shaft 124a to drive the carrier chain. The tray loading apparatus is operated under the control of container sensing switches 210 and 211 (FIG. 2) arranged to sense the presence of an adequate number of containers in each column on the infeed conveyor, and a tray sensing switch 212 (FIGS. 8 and 10), arranged to sense the presence of a tray in proper position at the loading station, to automatically load the containers as they are fed to the tray loading apparatus and to time the feeding of the containers with the feeding of the trays to effect a proper loading operation.

Figure 14:
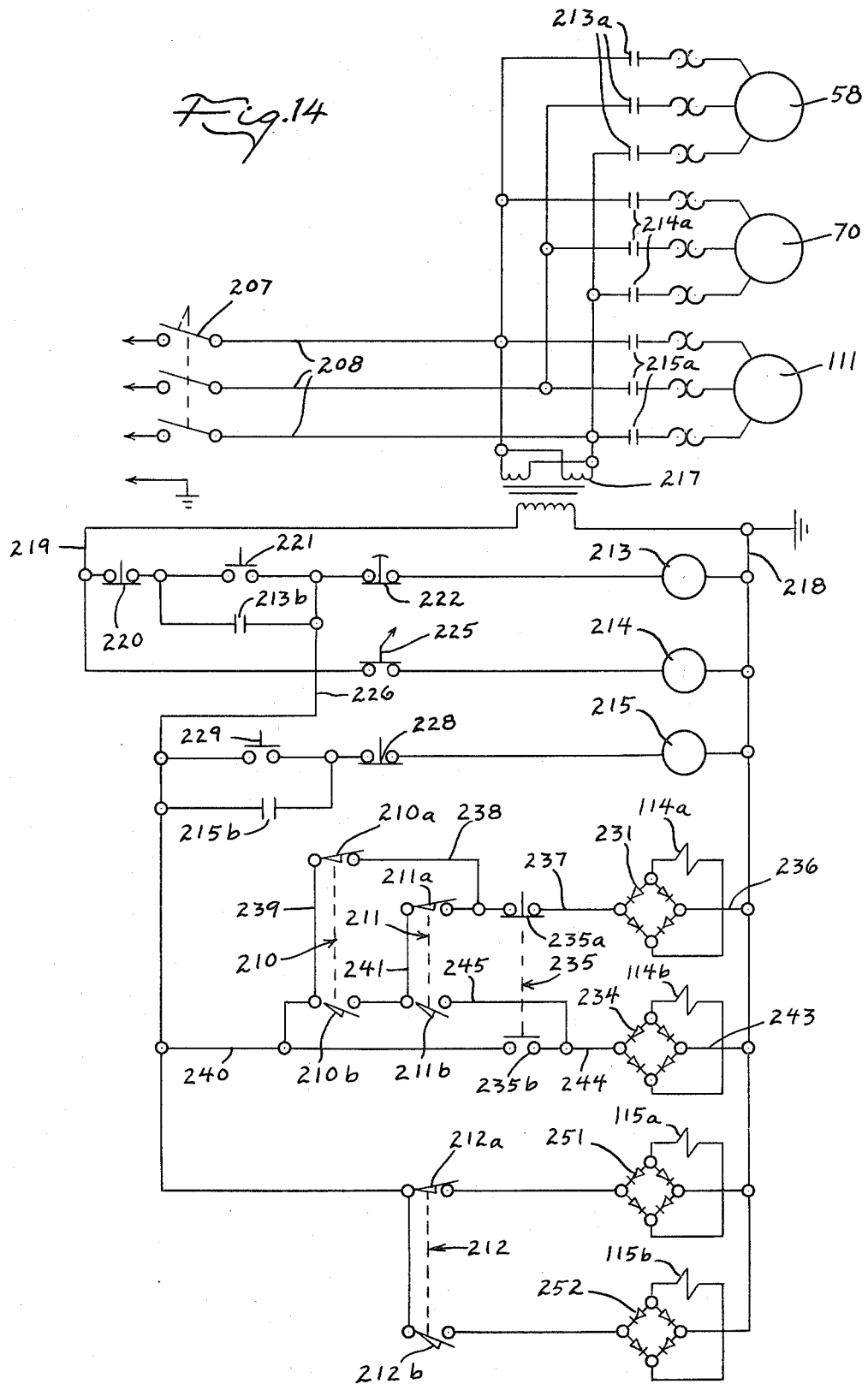
FIG. 14 is a schematic electrical diagram of the electrical controls for the tray loading apparatus.

As shown in FIG. 14, power is supplied from a suitable power source through switch 207 to conductors 208 and the infeed conveyor drive motor 58 is energized under the control of motor start contacts 213a; a vacuum pump drive motor 70 for the tray feed vacuum cups 81a is energized under the control of motor start relay contacts 214a, and the main drive motor 111 is energized under the control of motor relay contacts 215a. The control circuit is energized from the power source through a transformer 217 which supplies low voltage power to conductors 218 and 219. The infeed conveyor motor relay 213 is connected in a series circuit across conductors 218 and 219 through a normally closed emergency stop switch 220, a normally open start switch 221, a normally closed stop switch 222 so that the infeed conveyor drive motor is started when the start switch 221 is closed. Relay 213 closes the motor start relay contacts 213a to start the infeed conveyor motor and also closes relay contacts 213b connected in parallel with the start switch 221 to establish a holding circuit to maintain the infeed conveyor in operation. The vacuum pump motor relay 214 is connected in series circuit with a manually operable on-off switch 225 across the conductors 218 and 219 so as to close the relay contacts 214a when the switch 225 is turned on to start the vacuum pump motor. The main drive motor relay 215 is connected so that it can start the main drive motor only after the infeed conveyor motor is started and, as shown, a conductor 226 is connected between relay contacts 213b and the normally closed stop switch 222. The main drive motor start relay 215 is connected in a series circuit with a normally closed stop switch 228 and a normally open start switch 229 so as to close the main drive motor relay contacts 215a when the start switch 229 is closed. Relay 215 also operates relay contacts 215b connected in parallel with the normally open start switch 229 to maintain a holding circuit for the main drive motor. The clutch-brake unit 114 includes a clutch coil 114a and a brake coil 114b which are alternately energized under the control of cup sensing switches 210 and 211. Switch 210 is of the double-pole type having normally closed contacts 210a and normally open contacts 210b and switch 211 is similarly of the double-pole type having normally closed contacts 211a and normally open contacts 211b. The clutch 114a is energized from the output of a full-wave bridge rectifier circuit 231 and the brake 114b is similarly energized from the output of a full-wave bridge rectifier circuit 234. Power is supplied to the rectifier circuits 231 and 234 and hence the brake coils 114a and clutch coils 114b under the control of container sensing switches 210 and 211 and a manually operable jog switch 235 having normally closed contacts 235a and normally open contacts 235b in a manner to energize the brake coil 114a when either switch 210 or 211 senses the absence of a container on the infeed conveyor and to energize the clutch coil 114b to start the article transfer mechanism when both container sensing switches are actuated by a container. As shown in FIG. 14, the input of bridge circuit 231 is connected through conductor 236 to power conductor 218 and the input of the bridge circuit is otherwise connected through conductor 237, normally closed jog switch contacts 235a, conductor 238, normally closed container sensing switch contacts 210a, and conductors 239 and 240 to the other power conductor 226 so that the brake coil 114a is energized when switch 210 is in its normal position. The input of the bridge circuit 231 is also connected through normally closed jog switch 235a, normally closed sensing switch contacts 211a, conductor 241, normally open sensing switch contacts 210b and conductor 240 to the power conductor 226 so that the brake coil 114a is energized when switch 211 is in its normal position and switch 210 is actuated by a container to close contacts 210b and open contacts 210a. The input of the bridge circuit 234 is connected through conductor 243 to power conductor 218 and the input of the bridge circuit is otherwise connected through conductors 244, 245, normally open sensing switches 211b, 210b, and conductor 240 to the other power conductor 226 so that the clutch coil 114b is energized only when both container sensing switches 210 and 211 are closed. The normally open contacts 235b are connected through conductor 246 in parallel with contacts 210b and 211b to enable selective energization of the clutch coil 114b when the jog switch 235 is normally operated. Switches 210a and 211a are closed and switches 210b and 211b are open in the absence of containers at the switch sensing locations on the infeed conveyor so that the brake coil 114b is normally energized and the clutch coil is normally deenergized. When an adequate number of containers is supplied to the infeed conveyor to operate switches 210 and 211, the contacts 210a and 211a are open and contacts 210b and 211b are closed so that the brake is deenergized and the clutch 114a is energized to drive the tray conveyor and the outlet conveyor.

The clutch brake unit 115 for driving the transfer mechanism is operated under the control of the tray sensing switches. As diagrammatically shown in FIG. 11, the clutch-brake unit includes a clutch coil 115a and a brake coil 115b. Tray sensing switch 212 includes normally closed contacts 212a and normally open contacts 212b and the brake coil 115a is connected to the output of a full-wave bridge rectifier circuit 251, the input of which is connected in series with the normally closed contacts 212a of tray sensing switch 212. Brake coil 115b is connected to the output of a full-wave bridge rectifier circuit 252, the input of which is connected in series with the normally open contacts 212b of tray sensing switch 212. Switch contacts 212a are closed and switch contacts 212b are opened in the absence of a tray at the proper loading position of the tray loading station so that the brake coil 115a is normally energized to stop the drive to the transfer mechanism. When a tray is advanced to proper loading position, it operates the switch 212 to open the switch contacts 212a and to close switch contacts 212b to thereby deenergize the brake and energize the clutch to drive the article transfer mechanism.

The tray loading apparatus is adapted for loading articles into the trays in different patterns. Trays of the form shown at $T_2$ in FIG. 9, in which the article receiving openings $O_2$ are arranged in straight columns, can be loaded with the tray loading apparatus arranged as shown in FIGS. 10 and 12. One or more lateral container guides 272 are preferably provided at the loading platform 15 to longitudinally guide the containers in columns as they move along the loading platform. Trays of the form shown at $T_1$ in FIG. 7, in which successive rows of tray receiving openings $O_1$ are staggered, can be loaded with the tray receiving apparatus arranged as shown in FIGS. 1, 10 and 11. In that arrangement, article stops 260 are mounted on selected article pushers 126, for example on alternate pushers, to extend forwardly from the pushers a distance to engage and shift the containers in a positive manner laterally outwardly as the pushers move along the inlet run. The article stops 260 are mounted for adjustment along the pushers, to adjust the outward lateral shifting of the containers engaged thereby and the longitudinal guide rail 272 is adjusted laterally outwardly relative to the lateral container guides 14 on the infeed conveyor to laterally guide the shifted row groups of articles. A spring arm 261 is advantageously mounted at 262 on the frame adjacent the inlet ends of the guide rails 272 to yieldably oppose outward lateral shifting of articles. The spring arm 261 is yieldable to allow outward lateral shifting of those row groups of articles which are moved in a positive manner by the stops 260, but the spring arm yieldably opposes lateral shifting of the other row groups of articles and may be adjusted, as shown in FIG. 8, to laterally shift such other row groups of articles laterally inwardly.

OPERATION

From the foregoing it is thought that the construction and operation of the tray loading apparatus will be readily understood. As described, the spacing of the pushers along the carrier chain is made substantially greater than the maximum horizontal dimension of the articles, measured in a direction lengthwise of the article path and the angle of convergence of the inlet run relative to the article path is adjusted so that the cosine of the angle of convergence times the spacing between adjacent article pushers substantially equals the spacing between the containers. With the tapered containers illustrated, the cosine of the angle times the spacing between the pushers along the carrier is made equal to the diameter of the containers so that the pushers progressively interleave between adjacent containers as they move along the inlet run, to separate the column of containers on the infeed conveyor into transverse row groups. The spacing between adjacent transverse row groups is increased as the pushers move along the forward run, as shown in FIG. 2, so that adjacent row groups are spaced apart a substantial distance during movement along the loading platform 15. The angle of divergence of the outlet run is adjusted in accordance with the desired spacing of the transverse row groups in the trays and, in particular, is adjusted so that the cosine of the outlet angle times the spacing of the pushers along the carrier chain is equal to the longitudinal spacing of the transverse rows of openings in the trays. Thus, the tray loading apparatus is adjustable to accommodate containers of different size as well as to load the containers into trays having different spacing between the rows of article receiving openings. Moreover, the tray loading apparatus is adapted to load the articles into trays in different patterns. In the form shown in FIG. 8, article stops 260 are mounted on selected ones of the article pushers to extend forwardly therefrom and engage the articles as the pushers move along the inlet run to laterally shift the articles engaged thereby. The spring arm 261 yieldably opposes lateral shifting movement of the articles so as to prevent lateral shifting of those articles not engaged by the aforedescribed article stops. In this manner, different row groups of articles can be laterally shifted relative to each other to effect loading of the trays in a different or staggered pattern.

The tray loading apparatus operates to automatically load the articles into trays as they are fed to the tray loader. The tray loader is operated at a speed such as to effect loading of the articles at a rate somewhat higher than the rate at which the articles are fed to the machine and, when there are insufficient articles as sensed by the switches 210 and 211, the clutch-brake unit 114 is operated to stop the tray conveyor and this, in turn, stops the tray transfer mechanism. However, when an adequate number of containers are supplied to the machine as sensed by the switches 210 and 211, the tray conveyor is again started to advance the tray to a loading position. At that time, the advance of the tray is interrupted and the tray sensing switch 212 is actuated to start the transfer mechanism drive. The transfer mechanism then operates to advance the transverse row groups of articles into the corresponding openings in a tray at the loading station and to thereafter advance the tray at the loading station with the articles for a distance at least sufficient to position the next succeeding row of article receiving openings for reception of a succeeding row of articles. When the tray is filled, the outlet conveyor advances the filled tray away from the loading station and the tray sensing switches 212 are then deactuated to stop the transfer mechanism drive until a succeeding tray is advanced into proper position.

While the tray loading apparatus is herein shown arranged for loading articles into trays in the form of generally flat blanks having spaced rows of article receiving openings, it will be understood that the tray openings can be in the form of depressions or pockets in the tray. Moreover, while the trays are shown having erectable legs for supporting the trays in an elevated position, it is to be understood that other means can be used to support the trays in an elevated position to engage the containers above their lower ends.

The embodiments of the invention in which an exclusive property or privilege is claimed are defined as follows:

1. In an apparatus for loading articles into trays including an infeed conveyor mechanism for advancing articles along an article path onto a loading platform, an article transfer mechanism having drive means therefor for advancing articles along the loading platform, and a tray feed mechanism including drive means therefor for advancing trays along a tray path below and converging with the article path adjacent the outlet end of the loading platform to receive articles therefrom, the improvement wherein the apparatus is arranged to load articles into trays having longitudinally spaced article receiving openings and the article transfer mechanism comprises a plurality of elongated generally horizontal article pushers mounted on an endless carrier at uniform carrier intervals therealong for movement in a generally horizontal closed loop course sequentially along an inlet run laterally converging at an inlet angle toward the article path, then along a forward run generally paralleling the article path, then along an outlet run diverging laterally at an outlet angle from adjacent the outlet end of the loading platform away from the article path, and then along a return run back to said inlet run, said elongated article pushers being pivotally mounted adjacent one end on said endless carrier for horizontal swinging movement relative thereto, guide mechanism for maintaining the article pushers generally perpendicular to the article path when in pushing engagement with an article during movement along at least a portion of said inlet run and during movement along said forward run and at least a portion of said outlet run to push the articles forwardly along the article path, the angle of convergence of the inlet run relative to the article path being so arranged that the article pushers at the inlet run are spaced apart in a direction paralleling the article path approximating the spacing of the articles on the infeed conveyor mechanism so that the pushers interleave with the articles and separate the same and the angle of divergence of the outlet run relative to the article path being so arranged that the article pushers at the outlet run are spaced apart a distance approximating the longitudinal spacing of the article receiving openings in the tray.

2. An apparatus for loading articles into trays according to claim 1 including means for interrupting advance of the trays by the tray feed mechanism when the article receiving opening at the forward end of the tray extends into the path of advance of the articles as they move off the loading platform, said article transfer mechanism being operative as the pushers move along the outlet run to advance articles into the article receiving openings and to thereafter advance the trays with the articles.

3. An apparatus for loading articles into trays according to claim 1 including stop means extending laterally from selected ones of said article pushers for engaging articles as the pushers move along said inlet run to shift the article engaged by said selected ones of the article pushers crosswise of said article path.

4. An apparatus for loading articles into trays according to claim 1 wherein said endless carrier is adjustable to change said outlet angle of said outlet run to accommodate trays having article receiving openings at different spacing therealong.

5. An apparatus for loading articles into trays according to claim 4 wherein said endless carrier is adjustable to change said inlet angle of said inlet run to accommodate different spacing of the articles on the infeed conveyor mechanism.

6. An apparatus for loading articles into trays according to claim 1 wherein said elongated article pushers having follower means offset from their pivotal mounting on the carrier chain, said guide mechanism including an inlet guide track engaging said followers during movement along at least a portion of said inlet run, a forward guide track engageable with said followers during movement along said forward run and an outlet guide track engageable with said followers during movement along at least a portion of said outlet run.

7. An apparatus for loading articles into trays according to claim 6 including means for adjusting said outlet angle of said outlet run of endless carrier to accommodate trays having article receiving openings at different spacing therealong, and means for adjusting said outlet guide track relative to said outlet run of said endless carrier to maintain the pushers generally perpendicular to the article path when in pushing engagement with an article as they move along the outlet run.

8. An apparatus for loading articles into trays according to claim 6 including means for adjusting said inlet angle of said inlet run of said endless carrier to accommodate different spacing of the articles on the infeed conveyor, means for adjusting said outlet angle of said outlet run to accommodate trays having article receiving openings at different spacing therealong, and means for adjusting said inlet and outlet guide tracks relative to said inlet and outlet runs of said endless carrier to maintain said article pushers generally perpendicular to said article path when in pushing engagement with an article.

9. An apparatus for loading articles into trays according to claim 1 wherein said tray feed mechanism comprises an endless-type tray conveyor for advancing trays along a tray path below and converging with the article path adjacent the outlet end of the loading platform, and means operative when a tray is advanced to a position in which the article receiving openings at the forward end of the tray extend to a level above said loading platform for interrupting advance of the tray by said tray conveyor.

10. An apparatus for loading articles into trays according to claim 9 wherein said endless-type tray conveyor has tray advancing lugs at locations spaced therealong a distance greater than the length of a tray, and said means for interrupting advance of the trays includes means for disengaging the tray from said lugs to stop advance of the tray without interrupting advance of the tray conveyor.

11. An apparatus for loading articles into trays according to claim 1 wherein said tray feed mechanism comprises an endless-type tray conveyor having tray advancing lugs at locations spaced therealong a distance greater than the length of a tray, means for disengaging a tray from said lugs when the tray is advanced to a loading position in which the article receiving openings at the forward end of the tray extend to a level above said loading platform to interrupt advance of that tray by the tray conveyor, means for sensing the presence of a tray at the outlet end of the loading platform, and means for stopping said endless carrier when a tray is advanced away from the outlet end of the loading platform and for restarting said endless carrier when a succeeding tray is advanced by the tray conveyor to a position at the outlet end of the loading platform.

12. An apparatus for loading articles into trays according to claim 1 including means for sensing the presence of a tray adjacent the outlet end of said loading platform, and means for stopping said endless carrier when a tray is advanced away from said outlet end of the loading platform and for restarting said endless carrier when a succeeding tray is advanced by the tray feed mechanism to a position at the outlet end of the loading platform.

13. An apparatus for loading articles into trays according to claim 12 including means for sensing the presence of articles on the infeed conveyor mechanism at an article sensing station in advance of said article transfer mechanism, and means for stopping said tray feed mechanism in the absence of articles at said article sensing station.

14. An apparatus for loading articles into trays according to claim 1 wherein said tray feed mechanism includes an endless type tray conveyor operative when driven to advance trays in spaced succession along a path below and converging with said article path at the outlet end of the loading platform, means for sensing the presence of a tray adjacent the outlet end of said loading platform, means for stopping said endless carrier when a tray is advanced away from the outlet end of the loading platform and for restarting said endless carrier when a succeeding tray is advanced by the tray conveyor to a position at the outlet end of the loading platform, means for sensing the presence of articles on the infeed conveyor mechanism at an article sensing station in advance of said article transfer mechanism, and means for stopping said tray conveyor in the absence of articles at said article sensing station.

15. An apparatus for loading articles into trays according to claim 1 including an outlet article guide spaced from the outlet end of said loading platform to define a tray receiving slot therebetween and disposed at a level adjacent the level of said loading platform to underlie and support the articles, and tray guide means extending above the level of said outlet article guide for guiding the trays to a level above said outlet article guide.

16. An apparatus for loading articles into trays according to claim 15 wherein said trays have depending portions for supporting the trays at a level above the lower ends of the legs, and outlet conveyor means extending from said outlet article guide at a level adjacent the level of the outlet article guide and arranged to support the articles on their bottoms and the trays on the lower ends of the depending portions.

17. In an apparatus for loading articles into trays including a loading platform having inlet and outlet ends, infeed conveyor means for advancing articles forwardly along an article path onto the loading platform, tray feed mechanism having drive means therefor for advancing trays along a path below and converging with the outlet end of the loading platform to receive articles therefrom, article transfer means having drive means therefor for advancing articles along the loading platform into the trays, and outlet tray converging mechanism for advancing filled trays, the improvement wherein said article transfer mechanism comprises an endless chain carrier entrained over first, second, third and fourth sprockets arranged in a generally trapezoidal pattern for movement in a generally horizontal closed loop extending from the first to the second sprocket in an inlet run which converges laterally at an inlet angle toward the article path; then from the second to the third sprocket in a forward run generally paralleling the article path; then from the third sprocket to the fourth sprocket in an outlet run which diverges laterally at an outlet angle relative to the article path, and then from the fourth sprocket back to the first sprocket in a return run, said article transfer mechanism also including a plurality of elongated generally horizontal article pushers pivotally mounted on the endless chain carrier for horizontal swinging movement relative thereto at uniform carrier intervals therealong greater than the maximum horizontal dimension of the articles measured in a direction lengthwise of the article path, followers on each of said pushers offset from the pivotal mounting thereof, inlet guide means engageable with said followers as said pushers move along at least a portion of said inlet run for maintaining said pushers generally perpendicular to said article path to push articles therealong, forward guide means engageable with said followers as said pushers move along said forward run maintaining said pushers generally perpendicular to said article path to push articles therealong, and outlet guide means engageable with said followers as said pushers move along at least a portion of said outlet run for maintaining said pushers generally perpendicular to said article path to push articles therealong, the angle of convergence of said inlet run relative to said article path being so arranged that the article pushers at the inlet run are spaced apart in a direction paralleling the article path a distance approximating the spacing of the articles on the inlet conveyor mechanism, said third sprocket being located adjacent the outlet end of said loading platform, and the angle of divergence of the outlet run relative to the article path being so arranged that the article pushers at the outlet run are spaced apart a distance approximating the longitudinal spacing of the articles in the tray.

18. An apparatus for loading articles into trays according to claim 17 including article engaging stops extending laterally from selected ones of said article pushers for engaging articles as the pushers move along said inlet run to shift the articles engaged by said selected ones of the article pushers crosswise of said article path.

19. An apparatus for loading articles into trays according to claim 17 including means supporting said first sprocket for shifting movement angularly in a generally horizontal plane relative to said second sprocket to at least one other position to adjust the angle of convergence of said inlet run relative to said article path and adapt the apparatus for different size articles, and means for adjusting said inlet guide means laterally relative to a plane through the axes of said first and second sprockets to maintain the pushers at substantially right angles to the article path as the pushers move along the inlet run.

20. An apparatus for loading articles into trays according to claim 17 including means supporting said fourth sprocket for shifting movement angularly in a generally horizontal plane relative to said third sprocket to at least one other position to adjust the angle of divergence of said outlet run relative to said article path and adapt the apparatus for loading articles into trays at different article spacing therein, and means for adjusting said outlet guide means laterally relative to a plane through the axes of said third and fourth sprockets to maintain the pushers at substantially right angles to the article path as the pushers move along the outlet run in pushing engagement with an article.

21. An apparatus for loading articles into trays according to claim 17 including means supporting said fourth sprocket for shifting movement angularly in a generally horizontal plane relative to said third sprocket to at least one other position to adjust the angle of divergence of said outlet run relative to said article path and adapt the apparatus for loading articles into trays at different article spacing therein, means for adjusting said outlet guide means laterally relative to a plane through the axes of said third and fourth sprockets to maintain the pushers at substantially right angles to the article path as the pushers move along the outlet run in pushing engagement with an article, means supporting said first sprocket for shifting movement angularly in a generally horizontal plane relative to said second sprocket to at least one other position to adjust the angle of convergence of said inlet run relative to said article path and adapt the apparatus for different size articles, and means for adjusting said inlet guide means laterally relative to a plane through the axes of said first and second sprockets to maintain the pushers at substantially right angles to the article path as the pushers move along the inlet run.

22. An apparatus for loading articles according to claim 21 wherein said first and second sprockets are mounted on an adjustable base for adjustment in a direction paralleling the article path toward and away from the third and fourth sprockets.

23. An apparatus for loading articles into trays according to claim 17 wherein outlet guide means includes an outlet guide track having a first guide rail paralleling said outlet run and engaging said followers to maintain the pushers generally perpendicular to the article path to push the articles therealong, said outlet guide track having a second guide rail spaced laterally from the first guide rail a distance substantially greater than the cross-section of the follower to allow the pushers to swing forwardly out of perpendicular relation to the article path when said outlet tray converging means advances a filled tray away from the article transfer mechanism.

24. An apparatus for loading articles into trays according to claim 17 wherein said tray feed mechanism comprises an endless-type tray conveyor having tray advancing lugs at locations spaced therealong a distance greater than the length of a tray, means for disengaging a tray from said lugs when the tray is advanced to a loading position in which the article receiving openings at the forward end of the tray extend to a level above said loading platform to interrupt advance of that tray by the tray conveyor, means for sensing the presence of a tray at the outlet end of the loading platform, and means for stopping said endless carrier when a tray is advanced away from the outlet end of the loading platform and for restarting said endless carrier when a succeeding tray is advanced by the tray conveyor to a position at the outlet end of the loading platform.

25. An apparatus for loading articles into trays according to claim 17 wherein said tray feed mechanism includes an endless type tray conveyor operative when driven to advance trays in spaced succession along a path below and converging with said article path at the outlet end of the loading platform, means for sensing the presence of a tray adjacent the outlet end of said loading platform, means for stopping said endless carrier when a tray is advanced away from the outlet end of the loading platform and for restarting said endless carrier when a succeeding tray is advanced by the tray conveyor to a position at the outlet end of the loading platform, means for sensing the presence of articles on the infeed conveyor mechanism at an article sensing station in advance of said article transfer mechanism, and means for stopping said tray conveyor in the absence of articles at said article sensing station.

* * * * *